(12) United States Patent
Maillet et al.

(10) Patent No.: US 6,424,701 B1
(45) Date of Patent: Jul. 23, 2002

(54) METHOD AND EQUIPMENT FOR INTERCEPTING TELEPHONE CALLS

(75) Inventors: Alain Maillet, La Chappelle sur Erdre; Nicole Klein, Saint Herblain, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/402,081

(22) PCT Filed: Jan. 30, 1998

(86) PCT No.: PCT/FR98/00183

§ 371 (c)(1),
(2), (4) Date: Sep. 29, 1999

(51) Int. Cl.[7] .................................................. H04Q 7/20
(52) U.S. Cl. ...................... 379/35; 379/32.01; 455/405; 455/417
(58) Field of Search .................. 455/412, 414, 455/403, 422, 424, 425, 564, 561, 560, 405, 410, 411, 417; 375/242; 379/32, 32.01, 32.05, 35, 71, 93.09, 211.01; 370/352, 353, 355, 356

(56) References Cited

U.S. PATENT DOCUMENTS

| | | | | | |
|---|---|---|---|---|---|
| 3,908,093 | A | * | 9/1975 | Riley | 379/168 |
| 4,680,783 | A | * | 7/1987 | Boeckmann | 379/6 |
| 4,726,048 | A | * | 2/1988 | Waldman et al. | 379/7 |
| 5,168,519 | A | * | 12/1992 | Scarinci et al. | 380/225 |
| 5,299,263 | A | * | 3/1994 | Beller et al. | 380/30 |
| 5,428,667 | A | * | 6/1995 | Easterling et al. | 455/410 |
| 5,590,171 | A | | 12/1996 | Howe et al. | |
| 5,742,665 | A | * | 4/1998 | Chao | 379/7 |
| 5,796,789 | A | * | 8/1998 | Eftechiou | 379/35 |
| 5,913,161 | A | * | 6/1999 | Ozulkulu et al. | 455/405 |
| 6,233,337 | B1 | * | 5/2001 | Etzel et al. | 380/28 |

FOREIGN PATENT DOCUMENTS

| | | |
|---|---|---|
| EP | 0 724 349 A1 | 7/1996 |
| FR | 2 749 998 A1 | 12/1997 |
| WO | WO 97/41678 | 11/1997 |

OTHER PUBLICATIONS

Forest Ranger, Wiretapping, bugs on line and listening in, 1979, p. 1.*
Patent Abstracts of Japan, vol. 006, No. 234 (E–143), Nov. 20, 1982 corresponding to JP 57 135560 A (Nippon Denki KK) Aug. 21, 1982.
Patent Abstracts of Japan, vol. 006, No. 028 (E–095) Feb. 19, 1982 corresponding to JP 56 149160 A (Hitachi Ltd) Nov. 18, 1981.
So–Lin Yen, "Intelligent MTS Monitoring System", Proceedings of the Annual International Carnahan Conference on Security Technology, Albuquerque, Oct. 12–14, 1994, No. Conf. 28, Oct. 12, 1994, pp. 185–187.
Patent Abstracts of Japan, vol. 008, No. 231 (E–274), Oct. 24, 1984 corresponding to JP 59 112751 A (Nippon Denki KK) Jun. 29, 1984.

* cited by examiner

*Primary Examiner*—Dwayne Bost
*Assistant Examiner*—Jean A Gelin
(74) *Attorney, Agent, or Firm*—Sughrue Mion, PLLC

(57) ABSTRACT

The invention concerns a method of intercepting a telephone call in a telecommunications system using at least one switch (12, 13; 24), in which signals in an interception loop (16) in said switch (12; 24) and to which the pulse coded multiplex (PCM) containing the call to be intercepted has been diverted are sampled at high impedance before they are directed to the addressee (14). The signal sampled at high impedance is directed to interception equipment (110) which extracts said call to be intercepted from the PCM. The signals in said interception loop (16) can include voice data and signaling interception data or only voice data, interception data concerning said call to be intercepted being transmitted to said interception equipment over a dedicated line (112).

29 Claims, 1 Drawing Sheet

METHOD AND EQUIPMENT FOR INTERCEPTING TELEPHONE CALLS

BACKGROUND OF THE INVENTION

The field of the invention is that of telecommunications. To be more precise, the invention concerns lawful telephone tapping systems, also known as call interception systems.

Telephone call interception systems have been used for many years in lawful telephone tapping systems (i.e. systems under the control of a defined authority, conventionally the state).

The oldest technique consists in applying a physical tap to the cables of a subscriber under surveillance. Unfortunately, this technique is impractical and easily detectable. Moreover, it is not compatible with digital communications (Integrated Services Digital Network—ISDN) or with mobile telephone systems.

Another technique consists in analyzing everything on a given line and then extracting therefrom the pertinent information. Clearly this solution is costly and complex, and ill-suited to universal telephone tapping, regardless of the communications system used.

A further technique that has been used is to create a conference call bridge within the exchange to which the subscriber to be intercepted is connected. The problem with this technique is that defects due to the various parties involved in the conference call bridge, and in particular the interceptor, are additive. It is therefore relatively easy to detect. Moreover, it is not possible to effect more than one interception of the same subscriber using this technique.

However, it is desirable for this to be possible in some situations. This is the case in particular when the same communications system covers geographical areas administered by different authorities. For example, a mobile radio system satellite can conventionally cover a plurality of states, each of which has its own law and its own requirements in terms of lawful telephone tapping. Consequently, various telephone tapping control centers must be provided (one per area). It must of course be possible for more than one of these centers to intercept the same subscriber, if necessary.

Generally speaking, the various systems that have been used in the past have at least some of the following drawbacks:

they are easily detectable by a subscriber, they necessitate a great amount of processing to extract the wanted information from the signals intercepted, they cannot be used interchangeably on all types of network (analog telephone network, digital network, cellular mobile radio network, satellite communication network, etc.), they do not provide for selective interception as a function of different centers associated with separate geographical areas, they are not completely effective against call rerouting and subscriber number changing techniques, they cannot transmit intercepted data to more than one separate control center, etc.

One objective of the invention is to overcome these various drawbacks of the prior art.

To be more precise, a first objective of the invention is to provide a method of intercepting calls sent and/or received by a subscriber, regardless of the communications systems employed, even if the subscriber uses particular means such as call rerouting, call transfer, number change, etc.

Another objective of the invention is to provide a method of the above kind which can intercept all types of call (voice, fax, data) and all required signaling information.

A further objective of the invention is to provide a method of the above kind which necessitates simple and effective processing of the data to be intercepted and which is totally undetectable by subscribers.

A further objective of the invention is to provide a method of the above kind providing for selective telephone tapping in different geographical areas and for transmitting an intercepted call to a plurality of interception control centers, corresponding to different beneficiaries (the courts, the police, etc.), for example.

A further objective of the invention is to provide a method of the above kind which provides for selective tapping of a group of lines (corresponding to all the lines used for an exhibition or all the lines of a company, for example).

The above objectives, and others that emerge more clearly hereinafter, are achieved by the invention by means of a method of intercepting a telephone call in a telecommunications system using at least one switch, in which method signals in an interception loop in said switch and to which the pulse coded multiplex (PCM) containing the call to be intercepted has been diverted are sampled at high impedance before they are directed to the addressee.

SUMMARY OF THE INVENTION

This makes it possible to perform lawful telephone tapping without this being detectable by the users. There is no restriction on the communications systems used (in particular digital and mobiles systems).

The signal sampled at high impedance is advantageously directed to interception equipment which extracts said call to be intercepted from the PCM. The interception equipment can be inside the switch or at a separate location.

In a first embodiment of the invention, the signals in said interception loop comprise voice data and signaling interception data. In this case, the interception equipment first extracts the interception data from the sampled signal and then performs the interception proper.

In a second embodiment, offering enhanced security, the signals in said interception loop comprise only voice data, interception data concerning said call to be intercepted being transmitted to said interception unit on a dedicated line by control means of the switch handling said call to be intercepted.

In this case, knowing only the content of the sampled signal is not sufficient to perform the interception.

In a third embodiment, part of the interception data from a call is transmitted together with the signals conveyed by said interception loop, and part via a dedicated line.

Said interception equipment is advantageously connected to an interception control center which in turn feeds one or more separate telephone tapping centers. In the invention, there is no intrinsic limitation on the number of telephone tapping centers it can feed.

Each of said telephone tapping centers preferably corresponds to a geographical interception area, such as a state or an administrative region. More than one telephone tapping center can of course be allocated to the same geographical area.

Each of said geographical interception areas is defined by at least one of the following, for example:

a list of identifiers of cells of a cellular network forming said geographical interception area, a list of dialing prefixes allocated to said geographical interception area, at least one item of information, supplied by way of a signaling parameter, defining the geographical interception area to which the call to be intercepted relates, and at least one item of information, supplied by the switch, defining the geographical interception area to which the call to be intercepted relates.

This assures great flexibility, the invention requiring no correlation between the geographical interception areas and the coverage areas of the switch.

An advantageous feature of the invention is that said interception can cover a plurality of lines corresponding to the same source and/or the same destination (for example an exhibition, a company, etc.).

Said telecommunications system can be one of the following:

an integrated services digital communication network, a cellular mobile radio network, or a satellite radio network.

The invention also concerns the interception equipment used in a method as described hereinabove.

BRIEF DESCRIPTION OF THE DRAWING

Other features and advantages of the invention will become more clearly apparent on reading the following description of a preferred embodiment of the invention and from the accompanying drawings, in which.

DETAILED DESCRIPTION OF THE INVENTION

1—Glossary

To simplify the following description and the figures, the main abbreviations employed and their usual meaning are listed below:

| | |
|---|---|
| BSS | base station; |
| IA | interception area; |
| IE | interception equipment; |
| IMC | interception management center; |
| IRI | interception related information; |
| LE | local exchange; |
| LEA | lawful enforcement agency; |
| LEMF | lawful enforcement monitoring facilities; |
| MSC | mobile switching center; |
| MSISDN | international mobile station ISDN number; |
| PCM | pulse coded multiplex; |
| RCP | radio control point; |
| SSP | service switching point. |

2—General Principle of the Invention

Figure 1:
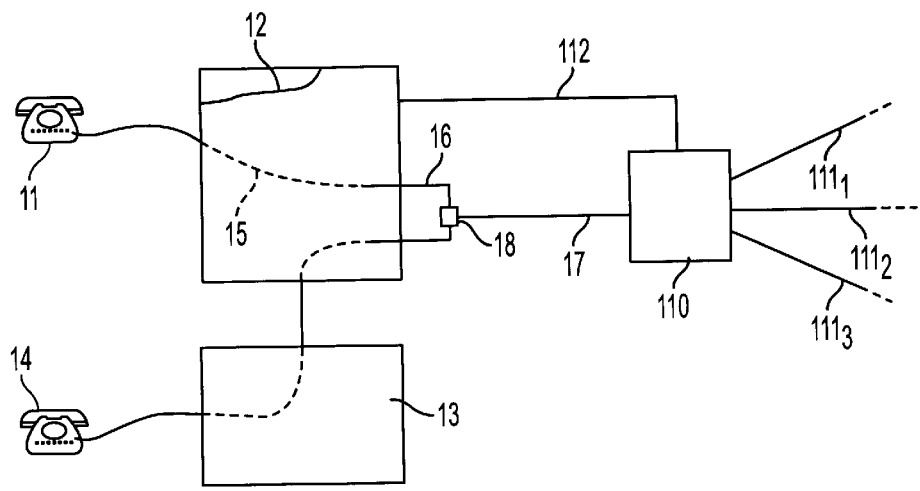
FIG. 1 shows the general principle of the interception method of the invention.

FIG. 1 shows the general principle of the invention. As indicated above, the objective of the invention is to intercept telephone calls sent and/or received by a target telephone terminal 11.

The target telephone terminal can be of any type (analog, digital, fixed, portable, etc.). It can also correspond to a set of identified terminals (corresponding to a set of lines of a company or the lines used for an exhibition, for example).

The target terminal 11 is conventionally connected to a telephone network via a local exchange (LE) 12, in turn connected via the telephone network to the local exchange 13 from which the terminal 14 of the other party to the call depends.

According to the invention, the pulse coded multiplex (PCM) 15 carrying the call in the exchange 12 is diverted to a dedicated PCM loop 16 before it is passed in the conventional way to the remote exchange 13. There is a high-impedance sampling point 18 on the PCM loop 16. The signal sampled at the high impedance is transmitted (at 17) to interception equipment (IE) 110, which can direct the intercepted calls to one or more interception management centers (IMC) $111_1$ through $111_3$.

Interception therefore occurs at a time when the voice signal is easily decodable. The interception is undetectable and in particular imperceptible to the subscriber.

Two options are available:

either the signaling interception data and the voice signal are sampled on the PCM loop 16, or only the voice signal is sampled, on the basis of signaling interception information transmitted over a separate line 112 (which delivers the interception information PS and CIC, for example).

Note that the PCM loop 16 can be local (inside the exchange 12) or at any appropriate remote location. The same applies to the IE 110.

Although only one loop 16 is shown, a plurality of similar loops could obviously be provided in an exchange.

3—Example: the Globalstar System

One particular embodiment of the invention suited to the Globalstar network is described below. In the context of this network, the same interception management center (IMC) may need to manage a plurality of different geographical interception areas (IA). The coverage of a single satellite may correspond to more than one state, each of which can have its own rules and requirements for lawful telephone tapping.

Figure 2:
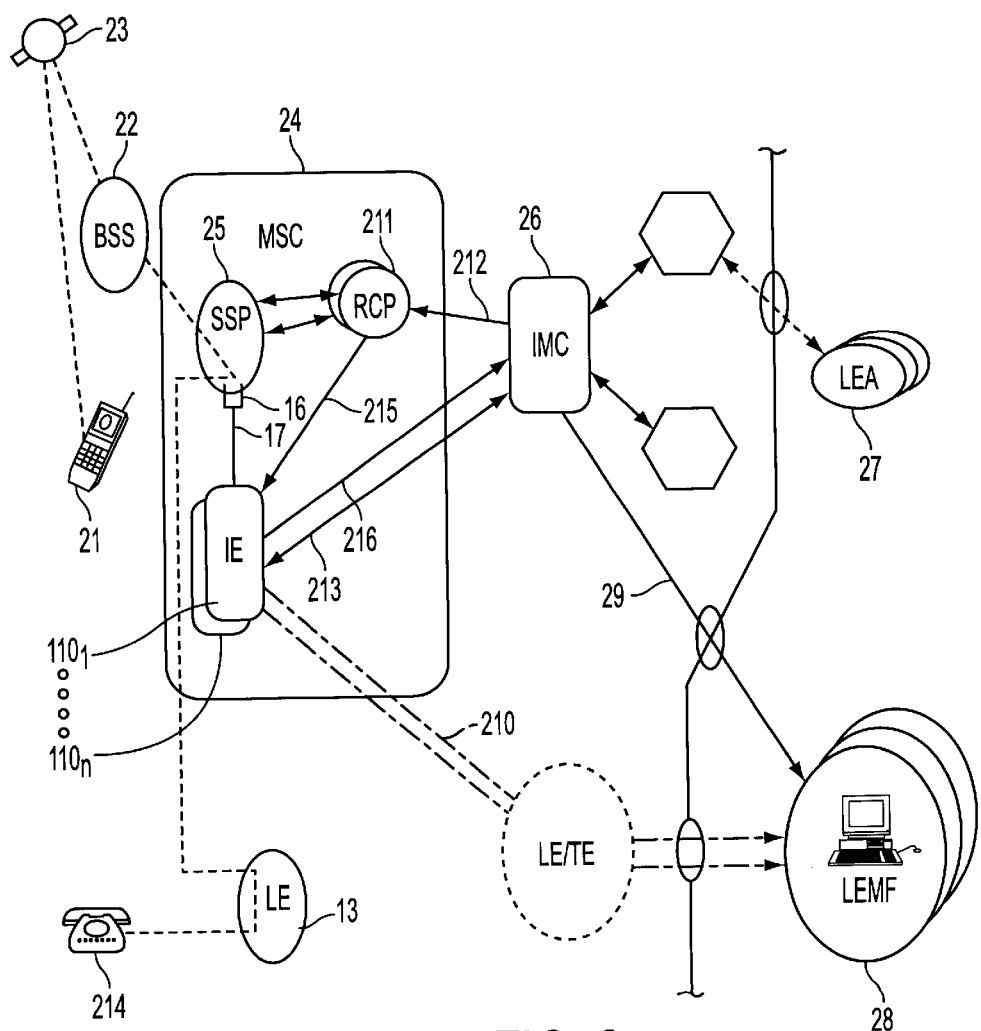
FIG. 2 shows the complete architecture of a system according to FIG. 1 suitable for use with the Globalstar system.

FIG. 2 shows the general architecture of the system employed.

The target mobile terminal 21 is linked to a base station (BSS) 22 via a satellite 23. The DSS 22 is connected to a service switching point (SSP) 25 which is part of a mobile switching center (MSC) 24. The PCM containing the call to be intercepted transits via the interception PCM loop 16 in the SSP 25 and is then directed to the remote exchange 13 to which the remote terminal 14 is connected.

The interception system of the invention is therefore based on the use of interception equipment (IE) 110 added to the SSP and an interception management center (IMC) 26. The functions it offers include real time monitoring of call traffic in one or more geographical interception areas (IA) for particular subscribers.

The system can intercept the following information:

information carried by the voice channel (voice, fax, data), interception related information (IRI), including in particular:

some of the use information, the content of short messages, additional data such as the date and time of the events concerned and the location of the mobile station.

Because interception is effected at high impedance on the PCM loop 16, it is not detectable by the parties to the intercepted call and has no effect on any subscriber services.

One or more interception equipment units $110_1$ through $110_n$ can be associated with each SSP 25. An interception management center 26 can supervise one or more MSC 24.

According to the invention, the IMC 26 can manage more than one geographical interception area (IA). An IA is a subset of the geographical coverage area associated with a satellite 23 and is defined by a set of logical cells managed by an operator or a given service provider. The set of cells corresponds to a geographical area. The operator or service provider can define one or more IAs to cover all the geographical areas in which it provides a service.

Several IAs can cover all or part of the same geographical area, for example if that area is covered by more than one operator or service provider.

Interception of a given target subscriber in a given IA is initiated by a lawful enforcement agency (LEA). A lawful enforcement monitoring facilities (LEMF) center 28 manages interception-related information (IRI) 29 delivered by the IMC 26 and intercepted data 210 delivered by the IE $110_i$.

A target subscriber is defined by an international mobile station ISDN number (MSISDN). The MSISDN to be intercepted and the addresses of the LEMF centers 28 to which that information must be sent are managed at the level of the IMC 26. In the IMC, management of the interception is based on an approach at the IA level, subject to the following rules:

a target subscriber can be intercepted in one or more IAs, a radio control point (RCP) 211 can cover more than one IA, and an IA can be covered by more than one RCP 211.

At the level of the interception equipment $110_i$, the data concerning the target subscribers is also organized at IA level. Accordingly, an IMC 26 delivers a list of the IAs to all the IE $110_l$ through $110_n$ of a MSC 24 (name of each IA and information relating thereto).

When an interception has been defined:

the IMC 26 sends (at 212) the MSISDN of the target subscriber to the RCP 211 concerned, i.e. the one associated with the IA, and the IMC 26 transmits (at 213) the MSISDN of the target subscriber and the identifier of the LEMF user of the LEA 27 to which the interception information must be sent to each IE $110_l$ through $110_n$ of the MSC 24 concerned.

When a target subscriber receives or makes a call, the call is directed by the SSP 25 to the PCM loop 16 before it is directed to its final destination 14.

The interception equipment $110_i$ performs the following operations in particular:

it determines the IA concerned from the identifier of the cells associated with the intercepted call, or from the MSISDN number of the intercepted subscriber, if their location is unknown, it extracts signaling information and voice data from the channel corresponding to the intercepted call (identified by the interception data 215 supplied by the RCP 211), and if the call concerns a subscriber to be intercepted:

the interception equipment $110_i$ performs the interception using interception data included in the signaling associated with the call and/or on a dedicated data channel incorporated into the loop 16 and/or additional interception data received from the RCP 211, the IE $110_i$ sends (at 216) the interception related information to the IMC 26, and the IE $110_i$ sets up one or two ISDN digital calls (at 210) to the LEMF 288 concerned.

If two calls are set up at 210, they respectively correspond to sending and receiving. If only one call is set up, sending and receiving are combined prior to transmission.

The IMC 26 transmits (at 29) interception reports to the LEMF 28. A first report is supplied at the beginning of each call intercepted and a second report is transmitted at the end of the call. Each report includes an interception reference for cross-referencing to the information supplied (at 210) by the interception equipment.

The embodiment described above can easily be adapted to suit other communications systems without departing from the scope of the invention.

The operation of the various units downstream of the interception loop are not described in detail. They are not directly relevant to the invention and are described elsewhere, for example in the context of standardization.

What is claimed is:

1. A method of intercepting a telephone call in a telecommunications system using at least one switch, characterized in that signals in an interception loop in said switch and to which pulse coded multiplex (PCM) containing the call to be intercepted has been diverted are sampled at high impedance before they are directed to the addressee.

2. An interception method according to claim 1, characterized in that the signal sampled at high impedance is directed to interception equipment which extracts said call to be intercepted from the PCM.

3. An interception method according to claim 2, characterized in that said interception equipment is connected to an interception management center feeding one or more separate telephone tapping centers.

4. An interception method according to claim 3, characterized in that each of said telephone tapping centers correspond to a geographical interception area such as a state or an administrative region.

5. An interception method according to claim 4, characterized in that each of said geographical interception areas is defined by at least one of the following:

a list of identifiers of cells of a cellular network forming said geographical interception area, a list of dialing prefixes allocated to said geographical interception area, at least one item of information, supplied by way of a signaling parameter, defining the geographical interception area to which the call to be intercepted relates, and at least one item of information, supplied by the switch, defining the geographical interception area to which the call to be intercepted relates.

6. An interception method according to claim 1, characterized in that the signals in said interception loop comprise voice data and signalling interception data.

7. An interception method according to claim 1, characterized in that the signals in said interception loop comprise only voice data, interception data concerning said call to be intercepted being transmitted to said interception equipment on a dedicated line by control means of the switch handling said call to be intercepted.

8. An interception method according to claim 1, characterized in that the interception data of the call is transmitted in part together with the signals carried by said interception loop and in part via a dedicated line.

9. An interception method according to claims 1, to 5, characterized in that said interception can cover a plurality of lines corresponding to the same source and/or the same destination.

10. An interception method according to claim 1, characterized in that said telecommunications system is one of the following:

an integrated services digital communication network, a cellular mobile radio network, or a satellite radio network.

11. Equipment for intercepting a telephone call, in a telecommunications system using switch, characterized in that it comprises at least one high-impedance line sampling signals in an interception loop in said switch and to which the pulse coded multiplex (PCM) containing the call to be intercepted has been diverted before it is directed to the addressee.

12. Interception equipment according to claim 11, characterized in that it receives signalling data transmitted by a control center on a dedicated line and enabling extraction of the call to be intercepted.

13. Interception equipment according to claim 11, characterized in that it comprises means for transmitting an intercepted call to at least one telephone tapping center corresponding to separate geographical interception areas.

14. A telephone call interception method for a switching network, comprising:

provding an interception target identifier from an interception management center to a radio control point and to interception equipment of a mobile switching center;

providing an indication of said interception target identifier from said radio control point to a service switching point of said mobile switching center;

diverting a call to a dedicated PCM loop in said service switching point, when said call involves a station indicated by said interception target identifier;

sampling the PCM of said diverted call at a high impedance sampling point of said dedicated PCM loop to provide intercepted data to said interception equipment; and after said sampling, directing said call through said switching network to the destination station.

15. The telephone call interception method as set forth in claim 14, wherein:

said interception management center provides a monitoring facility identifier to said interception equipment; and said interception equipment directs said intercepted data through said switching network to a monitoring facility in accordance with said monitoring facility identifier.

16. The telephone call interception method as set forth in claim 15, wherein said interception management center sends interception related information to said monitoring facility with cross-reference information indicating said intercepted data provided by said information equipment.

17. The telephone call interception method as set forth in claim 15, wherein:

said interception management center provides more than one monitoring facility identifier, for the same interception target identifier, to said interception equipment; and said interception equipment directs said intercepted data through said switching network to more than one said monitoring facility in accordance with said more than one monitoring facility identifier.

18. The telephone call interception method as set forth in claim 17, wherein said monitoring facilities each correspond to a geographical interception area.

19. The telephone call interception method as set forth in claim 18, wherein said geographical interception area is a state.

20. The telephone call interception method as set forth in claim 18, wherein said geographical interception area is an administrative region.

21. The telephone call interception method as set forth in claim 18, wherein each said geographical interception area is defined by one or more of:

a list of identifiers of cells of a cellular network forming said geographical interception area, a list of dialing prefixes allocated to said geographical interception area, at least one item of information, supplied by way of a signalling parameter, defining the geographical interception area to which the call to be intercepted relates, and at least one item of information, supplied by the switch, defining the geographical interception area to which the call to be intercepted relates.

22. The telephone call interception method as set forth in claim 14, wherein the signals intercepted in said loop comprise voice data and signalling interception data.

23. The telephone call interception method as set forth in claim 14, wherein:

the signals intercepted in said interception loop consist of voice data, and interception data concerning said call is transmitted to said interception equipment on a dedicated line by control means of said mobile switching center.

24. The telephone call interception method as set forth in claim 14, wherein said interception target identifier indicates a plurality of lines relating to and identical entity.

25. The telephone call interception method as set forth in claim 14, wherein said switching network is an integrated services digital communication network.

26. The telephone call interception method as set forth in claim 14, wherein said switching network is a cellular mobile radio network.

27. The telephone call interception method as set forth in claim 14, wherein said switching network is a satellite radio network.

28. An interception equipment for supporting telephone call interception in a switching network, comprising:

a high-impedance line sampler coupled with a dedicated PCM loop to provide intercepted data, a switch of said switching network diverting a call to be intercepted to said loop to obtain said intercepted;

means for receiving a monitoring facility identifier and;

means for directing said intercepted data through said switching network to a monitoring facility indicated by said monitoring facility identifier.

29. The interception equipment for supporting telephone call interception as set forth in claim 28, further comprising means for receiving signalling data, over a dedicated line, said signalling data and enabling extraction of said intercepted data.

* * * * *